United States Patent
Wong et al.

(10) Patent No.: US 11,177,911 B2
(45) Date of Patent: Nov. 16, 2021

(54) BASE STATION AND USER EQUIPMENT

(71) Applicant: Convida Wireless, LLC, Wilmington, DE (US)

(72) Inventors: Shin Horng Wong, Basingstoke (GB); Martin Warwick Beale, Basingstoke (GB); Samuel Asangbeng Atungsiri, Basingstoke (GB)

(73) Assignee: Convida Wireless, LLC, Wilmington, DE (US)

( * ) Notice: Subject to any disclaimer, the term of this patent is extended or adjusted under 35 U.S.C. 154(b) by 0 days.

(21) Appl. No.: 16/484,829

(22) PCT Filed: Feb. 8, 2018

(86) PCT No.: PCT/EP2018/053231
§ 371 (c)(1),
(2) Date: Aug. 9, 2019

(87) PCT Pub. No.: WO2018/146229
PCT Pub. Date: Aug. 16, 2018

(65) Prior Publication Data
US 2019/0386791 A1    Dec. 19, 2019

(30) Foreign Application Priority Data
Feb. 10, 2017   (EP) ..................................... 17155750

(51) Int. Cl.
*H04L 1/18* (2006.01)
*H04L 5/00* (2006.01)

(52) U.S. Cl.
CPC .......... *H04L 1/1887* (2013.01); *H04L 1/1861* (2013.01); *H04L 1/1896* (2013.01); *H04L 5/0055* (2013.01)

(58) Field of Classification Search
CPC ... H04L 1/1861; H04L 1/1887; H04L 1/1896; H04L 5/0055
See application file for complete search history.

(56) References Cited

U.S. PATENT DOCUMENTS

| | | | | |
|---|---|---|---|---|
| 2012/0307689 A1* | 12/2012 | Kim | ...................... | H04W 72/12 370/280 |
| 2018/0070369 A1* | 3/2018 | Papasakellariou | .... | H04W 16/14 |
| 2019/0230694 A1* | 7/2019 | Lyu | ........................ | H04L 1/1819 |

(Continued)

FOREIGN PATENT DOCUMENTS

| WO | 2018/050431 A1 | 3/2018 |
|---|---|---|
| WO | 2018/059876 A1 | 4/2018 |

OTHER PUBLICATIONS

International Search Report and Written Opinion dated Jul. 13, 2018 for PCT/EP2018/053231 filed on Feb. 8, 2018, 18 pages.

(Continued)

*Primary Examiner* — Mansour Oveissi
(74) *Attorney, Agent, or Firm* — BakerHostetler

(57) ABSTRACT

A base station for a mobile telecommunications system has circuitry which is configured to communicate with at least one user equipment. The circuitry is further configured to: transmit a short data transmission within the time scheduled for a long data transmission; and schedule, based on the transmission of the short data, a HARQ ACK/NACK response relating to at least a part of the long data transmission.

14 Claims, 5 Drawing Sheets

(56) References Cited

U.S. PATENT DOCUMENTS

2019/0268120 A1* 8/2019 Gao .................. H04L 1/0061
2020/0045722 A1* 2/2020 Bae .................. H04W 72/1242
2020/0099499 A1* 3/2020 Yeo .................. H04W 68/02

OTHER PUBLICATIONS

LG Electronics, "On DCI contents for NR", 3GPP TSG RAN WG1 NR Ad-Hoc Meeting, R1-1700495, Spokane, USA, Jan. 16-20, 2017, 4 pages.

Sequans Communications, "On dynamic resource sharing between URLLC and eMBB in DL", 3GPP TSG RAN WG1 AH_NR Meeting, R1-1700642, Spokane, USA, Jan. 16-20, 2017, 6 pages.

Samsung, "Discussion on partial retransmission for eMBB", 3GPP TSG RAN WG1 Meeting NR#1, R1-1700959, Spokane, USA, Jan. 16-20, 2017, pp. 1-4.

NTT Docomo, "New SID Proposal: Study on New Radio Access Technology", 3GPP TSG RAN Meeting #71, RP-160671, Göteborg, Sweden, Mar. 7-10, 2016, 8 pages.

* cited by examiner

BASE STATION AND USER EQUIPMENT

CROSS-REFERENCE TO RELATED APPLICATIONS

The present application is based on PCT filing PCT/EP2018/053231, filed Feb. 8, 2018, which claims priority to EP 17155750.7, filed Feb. 10, 2017, the entire contents of each are incorporated herein by reference.

TECHNICAL FIELD

The present disclosure generally pertains to base stations and user equipment for a mobile telecommunications system.

TECHNICAL BACKGROUND

Several generations of mobile telecommunications systems are known, e.g. the third generation ("3G"), which is based on the International Mobile Telecommunications-2000 (IMT-2000) specifications, the fourth generation ("4G"), which provides capabilities as defined in the International Mobile Telecommunications-Advanced Standard (IMT-Advanced Standard), and the current fifth generation ("5G"), which is under development and which might be put into practice in the year 2020.

A candidate for providing the requirements of 5G is the so-called Long Term Evolution ("LTE"), which is a wireless communications technology allowing high-speed data communications for mobile phones and data terminals and which is already used for 4G mobile telecommunications systems. Other candidates for meeting the 5G requirements are termed New Radio (NR) Access Technology Systems (NR). An NR can be based on LTE technology, just as LTE was based on previous generations of mobile communications technology.

LTE is based on the GSM/EDGE ("Global System for Mobile Communications"/"Enhanced Data rates for GSM Evolution" also called EGPRS) of the second generation ("2G") and UMTS/HSPA ("Universal Mobile Telecommunications System"/"High Speed Packet Access") of the third generation ("3G") network technologies.

LTE is standardized under the control of 3GPP ("3rd Generation Partnership Project") and there exists a successor LTE-A (LTE Advanced) allowing higher data rates than the basic LTE and which is also standardized under the control of 3GPP.

For the future, 3GPP plans to further develop LTE-A such that it will be able to fulfill the technical requirements of 5G.

As the 5G system will be based on LTE or LTE-A, respectively, it is assumed that specific requirements of the 5G technologies will, basically, be dealt with by features and methods which are already defined in the LTE and LTE-A standard documentation.

In LTE, it is known to transmit data over a Physical Downlink Shared Channel (PDSCH), which can be considered as the main data bearing channel which is allocated to users on a dynamic and opportunistic basis. Typically, the user equipment (UE) performs a CRC (Cyclic Redundancy Check) for checking whether the data have been correctly received. In the case that the CRC check is positive/negative, for example, the UE transmits a hybrid automatic repeat request acknowledgement/negative acknowledgement (HARQ ACK/NACK), wherein the HARQ NACK response triggers a retransmission of the data. The HARQ ACK/NACK response is typically transmitted over the Physical Uplink Control Channel (PUCCH). The HARQ ACK/NACK response is a type of HARQ feedback from the UE.

Although there exist techniques for transmission and retransmission of data, it is generally desirable to improve the existing techniques.

SUMMARY

According to a first aspect, the disclosure provides a base station for a mobile telecommunications system comprising circuitry configured to communicate with at least one user equipment, wherein the circuitry is further configured to transmit a short data transmission in a long data transmission; and schedule, based on the transmission of the short data, a HARQ ACK/NACK response relating to at least a part of the long data transmission.

According to a second aspect, the disclosure provides a base station for a mobile telecommunications system comprising circuitry configured to communicate with at least one user equipment, wherein the circuitry is further configured to transmit a short data transmission in a long data transmission; and receive, based on the transmission of the short data, a HARQ ACK/NACK response relating to at least a part of the long data transmission after an already scheduled HARQ ACK/NACK response.

According to a third aspect, the disclosure provides a user equipment for a mobile telecommunications system comprising circuitry configured to communicate with at least one base station, wherein the circuitry is further configured to receive a long data transmission; and receive scheduling information for a HARQ ACK/NACK response, such that the HARQ ACK/NACK response can be transmitted after having processed at least one of the long data transmission and a received retransmission of at least a part of the long data, when data of the long data transmission are corrupted.

According to a fourth aspect, the disclosure provides a user equipment for a mobile telecommunications system comprising circuitry configured to communicate with at least one base station, wherein the circuitry is further configured to receive a long data transmission; and transmit a HARQ ACK/NACK response after having processed at least one of the long data transmission and a received retransmission of at least a part of the long data, when data of the long data transmission are corrupted.

Further aspects are set forth in the dependent claims, the following description and the drawings.

BRIEF DESCRIPTION OF THE DRAWINGS

Embodiments are explained by way of example with respect to the accompanying drawings, in which.

DETAILED DESCRIPTION OF EMBODIMENTS

Figure 1:
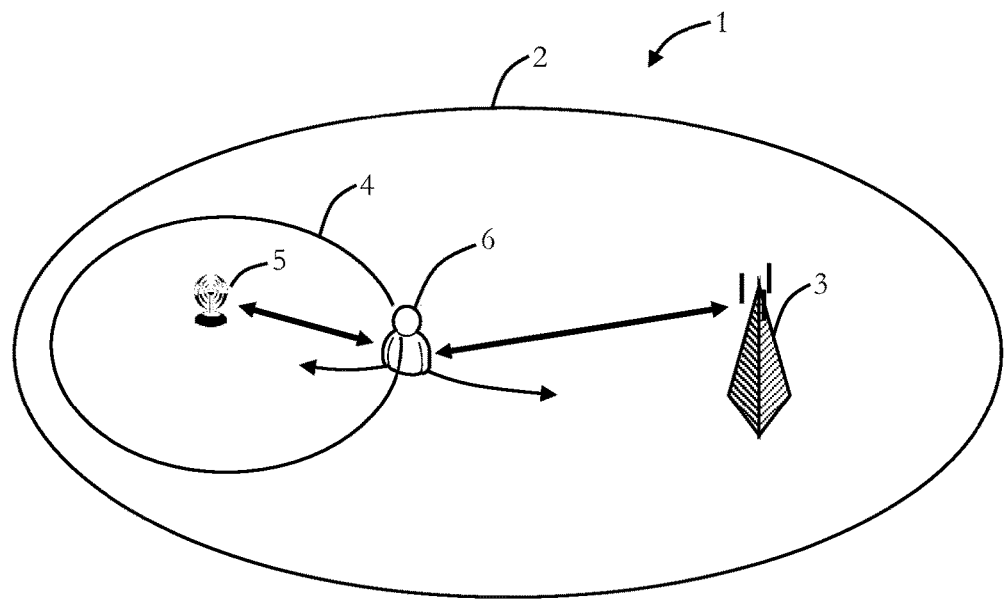
FIG. 1 illustrates an embodiment of a radio access network.

Before a detailed description of the embodiments under reference of FIG. 1 is given, general explanations are made.

As mentioned in the outset, in general, several generations of mobile telecommunications systems are known, e.g. the third generation ("3G"), which is based on the International Mobile Telecommunications-2000 (IMT-2000) specifications, the fourth generation ("4G"), which provides capabilities as defined in the International Mobile Telecommunications-Advanced Standard (IMT-Advanced Standard), and the current fifth generation ("5G"), which is under development and which might be put into practice in the year 2020.

A candidate for providing the requirements of 5G is the so-called Long Term Evolution ("LTE"), which is a wireless communications technology allowing high-speed data communications for mobile phones and data terminals and which is already used for 4G mobile telecommunications systems. Other candidates for meeting the 5G requirements are termed New Radio (NR) Access Technology Systems (NR). An NR can be based on LTE technology, just as LTE was based on previous generations of mobile communications technology.

LTE is based on the GSM/EDGE ("Global System for Mobile Communications"/"Enhanced Data rates for GSM Evolution" also called EGPRS) of the second generation ("2G") and UMTS/HSPA ("Universal Mobile Telecommunications System"/"High Speed Packet Access") of the third generation ("3G") network technologies.

LTE is standardized under the control of 3GPP ("3rd Generation Partnership Project") and there exists a successor LTE-A (LTE Advanced) allowing higher data rates than the basic LTE and which is also standardized under the control of 3GPP.

For the future, 3GPP plans to further develop LTE-A such that it will be able to fulfill the technical requirements of 5G.

As the 5G system will be based on LTE or LTE-A, respectively, it is assumed that specific requirements of the 5G technologies will, basically, be dealt with by features and methods which are already defined in the LTE and LTE-A standard documentation.

In LTE, it is known to transmit data over a Physical Downlink Shared Channel (PDSCH), which can be considered as the main data bearing channel which is allocated to users on a dynamic and opportunistic basis. Typically, the user equipment (UE) performs a CRC (Cyclic Redundancy Check) for checking whether the data have been correctly received. In the case that the CRC fails, for example, the UE transmits a hybrid automatic repeat request negative acknowledgement (HARQ NACK) response in order to trigger a retransmission of the data. Alternatively, in the case that the CRC passes, the UE transmits a HARQ acknowledgement (HARQ ACK). The general case of transmitting either a HARQ ACK or a HARQ NACK is referred to as transmitting a HARQ ACK/NACK. The HARQ ACK/NACK is transmitted over the Physical Uplink Control Channel (PUCCH), or piggybacked in a field of the Physical Uplink Shared Channel (PUSCH).

In 3GPP a Study Item (SI) on New Radio Access Technology (NR) has been agreed, as can exemplary be taken from 3GPP document RP-160671, "New SID Proposal: Study on New Radio Access Technology," NTT DOCOMO, RAN #71. On the basis of this SI, a new Radio Access Technology (RAT) for the next generation wireless communications system, i.e. 5G, is studied and developed.

The new RAT is expected to operate in a wide range of frequencies, in some embodiments, for example, from hundreds of MHz to one hundred GHz and it is expected to cover a broad range of use cases in some embodiments.

Typical use cases that may be considered, e.g. under this SI, are Enhanced Mobile Broadband (eMBB), Massive Machine Type Communications (mMTC), and Ultra Reliable & Low Latency Communications (URLLC).

A typical embodiment of an NR radio network RAN 1 is illustrated in FIG. 1. The RAN 1 has a macro cell 2, which is established by an LTE eNodeB 3, and an NR cell 4, which is established by an NR eNodeB 5.

A UE 6 can communicate with the LTE eNodeB 3 and, as long as it is within the NR cell 4, it can also communicate with the NR eNodeB 5.

Figure 2:
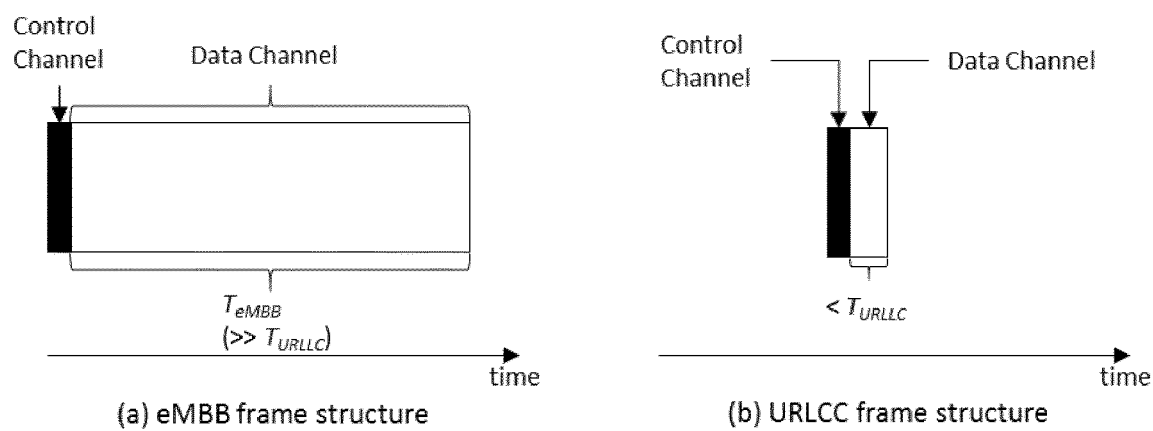
FIG. 2(a) illustrates an example of an eMBB frame structure.
FIG. 2(b) illustrates an example of a URLCC frame structure.

In some embodiments, eMBB services are characterized by high capacity with a requirement to support up to 20 Gb/s. For efficient transmission of large amounts of data at high throughput, eMBB requires a long scheduling time so as to minimize the overhead used (where the "scheduling time" may be understood as the time to allocate and transmit a data packet). An example eMBB frame structure is shown in FIG. 2 (a), left side, with transmission period $T_{eMBB}$ (T eMBB), where the control channel uses significantly smaller transmission resources than that of the data channel.

In some embodiments, an important requirement for URLLC is low latency measured from the ingress of a layer 2 packet to its egress from the network, with a proposed target of 1 ms. The URLLC data is expected to be short and hence a short scheduling time where the control and data have short duration are required within a frame structure that is significantly less than that of the eMBB frame structure. An example of a URLLC frame structure is shown in FIG. 2(b), right side, with a transmission period of $T_{URLLC}$ (e.g. 0.25 ms), where the control and data channels occupy a short duration of time. The transmission period of URLLC $T_{URLLC}$ is much smaller in some embodiments than that of eMBB $T_{eMBB}$, i.e. $T_{eMBB} >> T_{URLLC}$.

Figure 3:
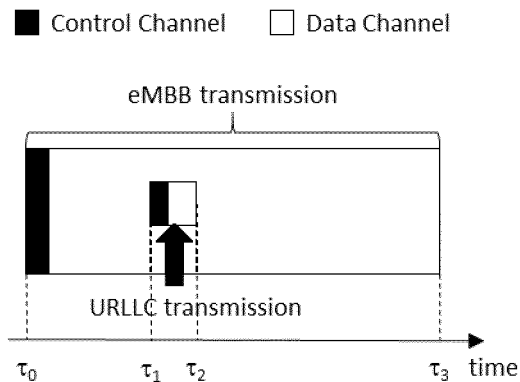
FIG. 3 illustrates an example where the eMBB and URLCC share the same resources.

Since URLLC transmission is ultra urgent and eMBB occupies a lot of resources, the URLLC transmission can occupy (pre-empt) a subset of the eMBB ongoing transmission. For example in FIG. 3, an eMBB transmission started at time $\tau_0$ and occupies all available transmission resources until time $\tau_3$. At time $\tau_1$, a URLLC packet arrives for another UE and it needs to be transmitted immediately. When the URLLC packet arrives at the eNodeB, e.g. over a backhaul interface, the eNB schedules the URLLC packet and transmits it over the air interface. As part of the arrival process at the eNodeB, the eNodeB may detect the arrival of this URLLC packet on the backhaul interface and may transmit it to the other UE. If there are no other available transmission resources, it would occupy a portion of the eMBB resources as shown in FIG. 3 until time $\tau_2$. As the URLLC packets occupy a portion of the eMBB resources, data of the eMBB transmission may be corrupted or lost.

In this specification, an eMBB transmission is an example for a "long data transmission" and a URLLC transmission is an example for a "short data transmission".

Figure 4:
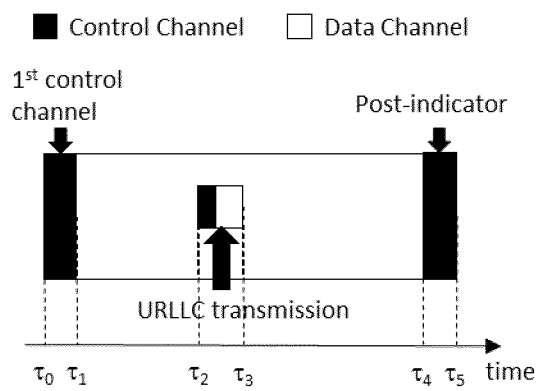
FIG. 4 illustrates use of a post indicator.

In some embodiments, as will also be discussed in more detail below, e.g. a post-indicator is transmitted at the end of the eMBB transmission over a (second) control channel, as shown in FIG. 4, wherein this post-indicator (transmitted over the control channel at time $\tau_4$ until $\tau_5$) would inform the UE receiving the eMBB transmission about the resources within the eMBB transmission that have been corrupted by the URLLC transmission (of another UE). Hence, in this example, the first control channel transmission starts at time $\tau_0$ and lasts until $\tau_1$, where also the data channel transmission starts. Also here it is assumed that a URLLC transmission occupies some resource, e.g. from time $\tau_2$ until $\tau_3$. The eMBB data transmission ends at time $\tau_4$, where a second control channel transmission takes place until time $\tau_5$, where, for example, the post indicator is transmitted. The transmission time of the second control channel from $\tau_4$ until $\tau_5$ may also fall within the time interval scheduled for the eMBB transmission.

Moreover, in some embodiments, such a post-indicator can further include scheduling information for scheduling a retransmission of the eMBB information that is affected by the URLLC corruption. Such a retransmission may be expected to occur prior to a HARQ ACK/NACK feedback from the UE.

Figure 5:
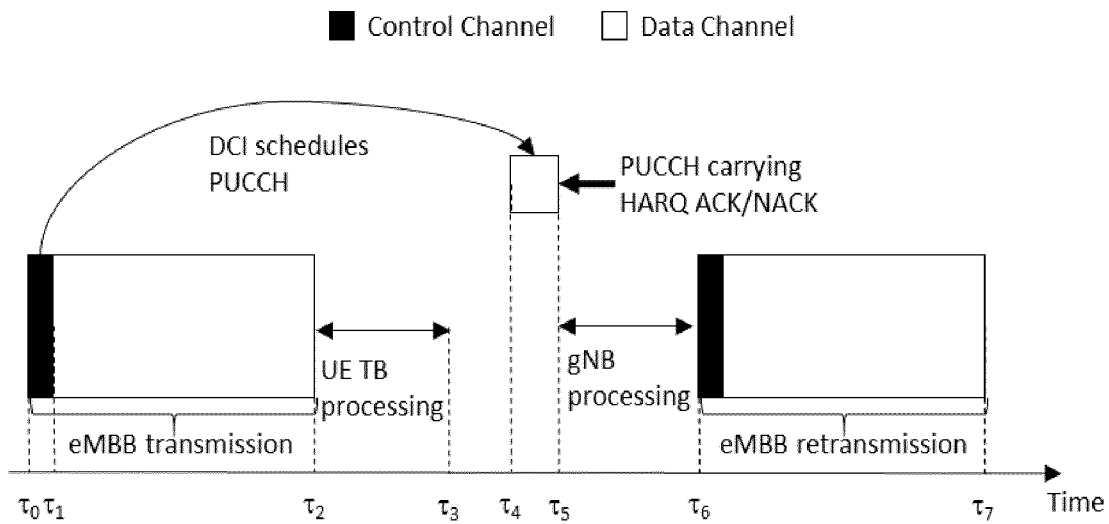
FIG. 5 illustrates use of a HARQ transmission.

Typical data transmission, such as eMBB, utilizes in some embodiments a HARQ retransmission, as illustrated in FIG. 5.

At time $\tau_0$ an initial eMBB transmission is sent to the UE, starting with the control channel transmission until time $\tau_1$, and it ends at time $\tau_2$, wherein the UE would finish decoding of the received transport block TB at time $\tau_3$.

If the CRC check performed by the UE fails, as also discussed above, the UE sends a HARQ feedback at time $\tau_4$ at the resources scheduled with the DCI, thereby notifying the NR eNodeB (also referred to as gNB) of a failed reception.

The gNB would process the feedback and encode a retransmission between time $\tau_5$ and $\tau_6$ and then transmits the eMBB retransmission at time $\tau_6$. The HARQ feedback in most LTE systems is transmitted at a fixed and known time after the end of the PDSCH transmission, that is, using FIG. 5 as an example, a fixed and known time can be at time $\tau_4$, which is after the expected time taken by the UE to process the TB. Although such a fixed HARQ time line is simple and predictable, some LTE features such as NB-IoT (Internet of Things) have a flexible HARQ time line where the HARQ feedback (carried by the PUCCH) is not a fixed period after the end of the PDSCH transmission, but instead is being indicated by the DCI used to schedule the downlink grant, i.e., in FIG. 5, the DCI carried by the physical control channel at time $\tau_0$, which provides a downlink grant to schedule the eMBB transmission (between time $\tau_1$ and $\tau_2$) and also schedules resources (frequency and time) for the PUCCH that carries the HARQ feedback.

Since, in some embodiments, a gNB can pre-empt/interrupt an ongoing transmission such as an eMBB transmission, and post-indication or partial retransmission prior to HARQ feedback are possible, the UE's HARQ time line may be impacted.

Figure 6:
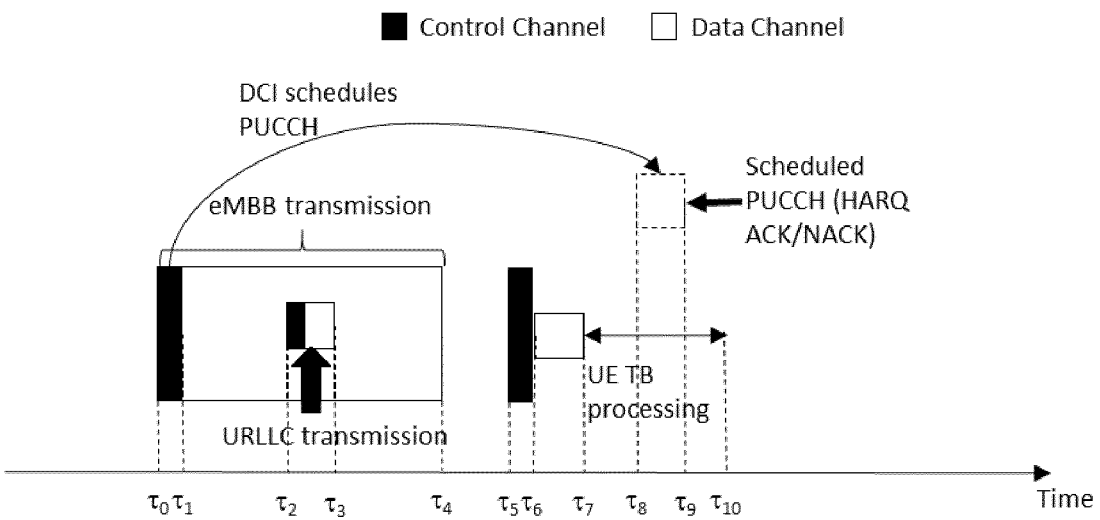
FIG. 6 illustrates the impact to a HARQ transmission due to early retransmission.

For example, as illustrated in FIG. 6, an eMBB transmission is scheduled at time $\tau_0$ and is sent to the UE between $\tau_1$ and $\tau_4$. At time $\tau_2$, a URLLC transmission pre-empt some of the eMBB resources and as also discussed above, this corruption due to the pre-emption by the URLLC transmission is repaired by indicating to the eMBB UE the resources that were corrupted at time $\tau_5$ and retransmit the portion that is corrupted between time $\tau_6$ and $\tau_7$.

The UE then needs to process the TB taking into account the corruption and any HARQ retransmission (e.g. the re-transmission between $\tau_6$ and $\tau_7$), which is performed during the time period between time $\tau_7$ and $\tau_{10}$.

As discussed above, the HARQ feedback can be scheduled by transmitting corresponding scheduling information within the DCI over the first control channel between times $\tau_0$ and $\tau_1$. This scheduling information can be implicit, as a known relationship between the first control channel resources and the resources used for the HARQ feedback or as a known relationship between the data channel resources and the resources used for the HARQ feedback.

However, the HARQ feedback is scheduled by the DCI to start at time $\tau_8$ and in this case, i.e. at a point of time where the UE is still processing the transport block TB, and, thus, the UE would not be able to send a HARQ feedback, since it has not finished decoding the eMBB transport block TB. The HARQ time line is therefore impacted in some embodiments.

Thus, in some embodiments, the network, e.g. the (NR) eNodeB, and/or the UE may dynamically override a previous HARQ feedback schedule, e.g. by either an explicit signaling and/or by an implicit signaling/procedure. This dynamic override may enable the HARQ feedback to be postponed to provide sufficient time for the UE to process the TB if changes are made to the transmission.

Consequently, some embodiments pertain to a base station, a user equipment and a mobile telecommunications system method, as will also be discussed in the following. The base station and the user equipment each have a circuitry which is configured to perform a method and the mobile telecommunications system method may include the methods as performed by the circuitry of the user equipment and of the base station.

The base station may be based on the principles of LTE (LTE-A) and/or it may be based on NR RAT, as also discussed above. The base station may be based on the known eNodeB of LTE, as one example, or it may be based on the discussed NR eNodeB. The user equipment may be, for example, a mobile phone, smartphone, a computer, tablet, tablet personal computer, or the like, including a mobile communication interface, or any other device which is able to perform a mobile telecommunication via, for example, LTE or NR, such as a hot spot device with a mobile communication interface, etc.

According to an embodiment, a base station for a mobile telecommunications system includes circuitry configured to communicate with at least one user equipment, wherein the circuitry is further configured to transmit a short data transmission in a long data transmission; and schedule, based on the short data transmission, a HARQ ACK/NACK response relating to at least a part of the long data transmission, and it may also schedule resources for at least one user equipment to transmit a HARQ ACK/NACK response. As discussed above, by transmitting the short data transmission in the long data transmission, the long data transmission may be corrupted. Moreover, the HARQ ACK/NACK response may be transmitted by the UE for requesting retransmission of at least a part of the long data transmission.

As discussed above, the long data transmission may be an enhanced mobile broadband data transmission and the short data transmission may be an ultra-reliable and low latency data transmission. The long data transmission may be a physical downlink shared channel data transmission, i.e. it may be transmitted over a PDSCH. The HARQ ACK/NACK response may be transmitted over a physical uplink control channel, i.e. PUCCH.

The scheduling of the HARQ ACK/NACK response may override, as indicated above, an existing schedule of a HARQ feedback/response and it may also include scheduling of corresponding resources which are needed for transmission of the HARQ ACK/NACK response by the UE, e.g. time/frequency resources on the PUCCH.

The circuitry may be further configured to retransmit at least a part of the long data transmission, based on the short data transmission, as discussed above. The retransmitted part may correspond to the data which is corrupted due to the short data transmission which occupied resources which are used for the long data transmission.

The scheduling of the HARQ ACK/NACK response may be performed when an already scheduled HARQ ACK/NACK response falls within a processing period of the user equipment for processing the received retransmitted part of the long data transmission.

The scheduling of the HARQ ACK/NACK response may be signaled over a control channel. Hence, in some embodiments, a (further), e.g. second control channel is established for the signaling. The control channel may be established before, during or after the short data transmission.

The scheduling of the HARQ ACK/NACK response may be signaled by a post-indicator, as also discussed above, wherein the post-indicator may be transmitted after the short data transmission, e.g. after termination of the short data transmission. In some embodiments, the post indicator may be transmitted after termination of the long data transmission.

The post-indicator may be a scheduling message.

The post-indicator may also indicate whether an already scheduled HARQ ACK/NACK response is maintained or whether the already scheduled HARQ ACK/NACK response is postponed. Hence, in some embodiments, the post indicator may include at least one bit indicating whether the schedule of the HARQ ACK/NACK response is maintained or whether the schedule is postponed, as discussed, in order to ensure that the processing of the transport block is finished when the UE is required to transmit the HARQ ACK/NACK response.

The already scheduled HARQ ACK/NACK response may be postponed by a predetermined time, wherein the predetermined time may be a predetermined time offset, which is based, for example, on a predefined (average or maximum) processing time which is needed by the UE for processing the transport block data which is retransmitted since the short data transmission has corrupted the long data transmission.

The predetermined time may be signaled to the user equipment.

The scheduling of the HARQ ACK/NACK response may include scheduling of resources for transmission of the HARQ ACK/NACK response, as also indicated above. As also indicated above, the scheduling of the HARQ ACK/NACK response may be transmitted based on a downlink control indicator (also referred to as downlink control information (DCI)).

Some embodiments pertain to a base station for a mobile telecommunications system including circuitry configured to communicate with at least one user equipment, wherein the circuitry is further configured to transmit a short data transmission in (place of a part of) a long data transmission; and receive, a HARQ ACK/NACK response relating to at least a part of the long data transmission after an already scheduled HARQ ACK/NACK response, i.e. at a time later than already scheduled for the HARQ ACK/NACK response. The circuitry may be also configured to schedule at least one of the long data transmission and the short data transmission.

By receiving the HARQ feedback or response after the point of time for which already a HARQ feedback/response was scheduled, it is possible that, for example, the UE can send the HARQ feedback/response after it has finished the processing of at least a part of the long data which has been retransmitted in order to compensate the corruption of data caused by the interfering short data transmission.

The following embodiments pertain to some kind of implicit signaling, as will be apparent from the following discussion. Of course, these embodiments can be combined with those discussed above, which pertain to an explicit signaling of postponement of the HARQ feedback/response.

The circuitry may be further configured to retransmit at least a part of the long data transmission, based on (e.g. in consequence of) the transmission or effecting of the short data (transmission), as discussed above. As mentioned the short data transmission may be scheduled by the circuitry (eNodeB). To the UE a short data corruption may also be indicated.

The HARQ ACK/NACK response may be received after a processing period of the user equipment for processing the received retransmitted part of the long data transmission, as also discussed above.

The circuitry may set a predefined time period for receiving the HARQ ACK/NACK response.

The predefined time period may be set based on the point of time for which the already scheduled HARQ ACK/NACK response is scheduled.

The predefined time period may be set based on a characteristic of a transport block (e.g. size) of the long data transmission. The predefined time period may be based on the size of an original eMBB transport block and/or it may be based on the size of a retransmission portion of an eMBB transport block.

The predefined time period may be set based on a transmission block size of the part of the long data transmission which is to be retransmitted, where the term "transmission block" relates to the physical bits or physical modulation symbols that are transmitted. In some embodiments, the transport block size of the retransmission has to be the same as the transport block size of the original transmission, while the sizes of the physical resources may be different between the transmission and the retransmission. The term "transport block" may mean in some embodiments data bits coming into the top of the transport channel processing chain and the term "transmission block" may mean in some embodiments physical bits coming out of the bottom of the physical channel processing chain, without limiting the present disclosure in that regard.

The predefined time period may be set based on an estimated processing time of the user equipment needed for processing the part of the long data transmission which is to be retransmitted. The estimated processing time may be predefined (in the network, e.g. also known in the base station), and may correspond to an average, maximum or the like processing time or it may be estimated, e.g. based on the size of the transmission block to be processed, or based on the transport block to be processed.

The predefined time period may be (only) set if the transport or transmission block size is greater than or equal to a predefined threshold value. The threshold value may be predefined in the network (and, thus, known to the base station).

Some embodiments pertain to a user equipment for a mobile telecommunications system comprising circuitry configured to communicate with at least one base station, wherein the circuitry is further configured to receive a long data transmission; and receive scheduling information for a HARQ ACK/NACK response, such that the HARQ ACK/NACK response can be transmitted after having processed at least one of the long data transmission and a received retransmission of at least a part of the long data, when data of the long data transmission are corrupted. Hence, even if a scheduled HARQ feedback (response) falls within the processing of the long data transmission and/or of the retransmitted data, by receiving (new) scheduling information, the HARQ feedback (response) can be transmitted after processing of the retransmitted part of the long data is finished. The scheduling of the HARQ ACK/NACK response may include scheduling of resources for the user equipment to transmit the HARQ ACK/NACK response, as also discussed above.

The scheduling information may be received over a control channel, as discussed above.

The scheduling information may be received in a post-indicator, as discussed above, wherein the post-indicator may include a scheduling message and/or wherein the post-indicator may indicate whether an already scheduled HARQ ACK/NACK response is maintained or whether the already scheduled HARQ ACK/NACK response is postponed.

The already scheduled HARQ ACK/NACK response may be postponed by a predetermined time, as discussed above, wherein the predetermined time may be a predetermined time offset.

The scheduling information may be represented by a downlink control indicator, as discussed above.

As discussed, the long data transmission may be an enhanced mobile broadband data transmission, the short data transmission may be an ultra-reliable and low latency data transmission, the long data transmission may be a physical downlink shared channel data transmission, and the HARQ ACK/NACK response may be transmitted over a physical uplink control channel.

Some embodiments pertain to a user equipment for a mobile telecommunications system comprising circuitry configured to communicate with at least one base station, wherein the circuitry is further configured to receive a long data transmission; and transmit a HARQ ACK/NACK response after having processed at least one of the long data transmission and a received retransmission of at least a part of the long data, when data of the long data transmission are corrupted. Hence, the user equipment may decide whether a formerly scheduled HARQ feedback can be used or not, i.e. whether the already scheduled HARQ feedback would fall within the processing of the long data transmission and/or of the retransmitted part of the long data, and, if this is the case, it can decide to transmit a HARQ feedback after termination of the processing. As discussed, this postponement may be to a predefined point of time.

For example, the HARQ ACK/NACK response may be transmitted after a predefined time period, wherein the predefined time period may be based on the point of time for which an already scheduled HARQ ACK/NACK response is scheduled. The predefined time period may be set based on a transport block size of the long data transmission, as discussed above. The predefined time period may be set based on a transmission block size of the part of the long data transmission which is retransmitted, as discussed. The predefined time period may be set based on an estimated processing time of the user equipment needed for processing the part of the long data transmission which is retransmitted, as discussed. The predefined time period may be set if the transmission or transport block size is greater than or equal to a predefined threshold value, as discussed.

Returning to FIG. 7, as also indicated above, in an embodiment, the said dynamic overriding is signaled to the UE in a post-indicator. This post-indicator can be a DCI and it can schedule a retransmission of the data channel or a portion of the data channel, in particular, of the data which is corrupted by the URLLC transmission occupying resources of an on-going eMBB data transmission. Hence, a post-indicator, especially one scheduling a retransmission, may shift the HARQ time line and therefore act as an efficient message to indicate the said dynamic overriding.

Figure 7:
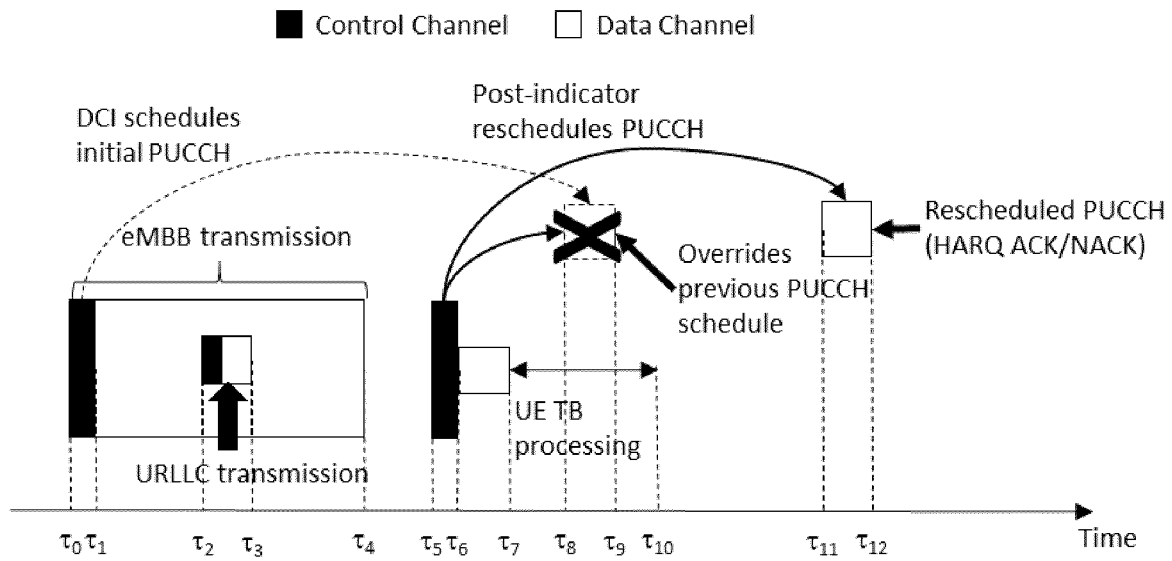
FIG. 7 illustrates an embodiment of a rescheduling of a HARQ transmission.

In more detail, as also illustrated in FIG. 7, the dynamic overriding is signaled in a post-indicator including a scheduling message that reschedules the resources, e.g. PUCCH, to carry the HARQ feedback.

FIG. 7 shows that a DCI carried by PDCCH at time $\tau_0$ schedules an eMBB transmission (time $\tau_1$ to $\tau_4$) and also schedules PUCCH resources for the corresponding HARQ feedback at time $\tau_8$ as also discussed above.

At time $\tau_2$ a URLLC transmission pre-empts the eMBB transmission thereby corrupting a subset of the eMBB resources.

A post-indicator indicating partial retransmission of the long data transmission is sent to the UE at time $\tau_5$, which schedules a partial retransmission (i.e. retransmitting eMBB information that was corrupted by the URLLC pre-emption) as discussed above.

This post-indicator, a DCI in this embodiment sent at time $\tau_5$, also reschedules the PUCCH resources, thereby postponing the HARQ feedback for the eMBB transmission from $\tau_8$ to $\tau_{11}$.

By delaying the HARQ feedback, the UE has sufficient time to process the TB taking into account the information in the post-indicator, to determine whether the eMBB TB is successfully decoded (i.e. passes the CRC check) and transmits the appropriate HARQ feedback at time $\tau_{11}$, i.e. at the postponed time for the HARQ feedback which has been scheduled by the post-indicator transmitted at time $\tau_5$.

This embodiment of FIG. 7 assumes that the initial PUCCH resource is scheduled in the DCI (carried by a PDCCH at time $\tau_0$). In other embodiments, this scheduling at the beginning of the eMBB transmission at time $\tau_0$ is not transmitted, i.e. the initial HARQ feedback is not scheduled by the DCI, but the initial HARQ feedback is expected at a fixed time after the PDSCH (e.g. eMBB) transmission, as it is the case, for example, for legacy LTE system (e.g. Rel-8 LTE). But also in such embodiments, the post-indicator can be transmitted at, for example, time $\tau_5$, i.e. after the eMBB transmission and, for example, also after the fixed time for which the initial HARQ feedback would have been expected, for scheduling a (new) HARQ feedback such that the UE can send the HARQ feedback at a point of time after which the processing of the transport block has been terminated.

As also discussed above, in another embodiment, the dynamic overriding signal in a post-indicator includes or even consists of a single bit, or includes a single additional bit, indicating whether the previous PUCCH schedule carrying HARQ feedback is maintained or postponed to a predetermined time. This predetermined time is a fixed time offset from the previous PUCCH schedule. In some embodiments, it is specified in the specifications or configured by higher layer signaling.

Of course, the PUCCH resources can be rescheduled more than once. In other words, the rescheduled PUCCH at time $\tau_{11}$ of FIG. 7 can be further dynamically overridden by a further control message (e.g. DCI) such that this PUCCH is further postponed/rescheduled at a later time.

In other embodiments, the dynamic overriding is implicitly indicated to the UE or a process is performed based on predefined rules, as will be discussed in the following.

For example, an expected UE TB processing time $T_{TB}$ for processing the TB is known to the network, e.g. to the NR eNodeB, and the UE. The processing time $T_{TB}$ may also be predetermined in the specifications or it may be provided via signaling of the UE capabilities.

Figure 8:
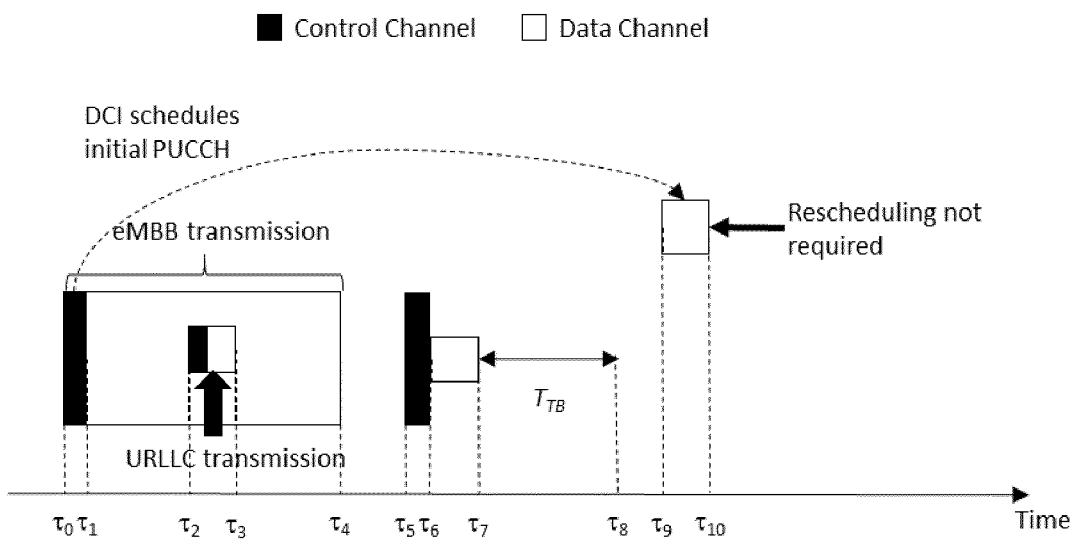
FIG. 8 illustrates an embodiment of a HARQ transmission.

As is also illustrated in FIG. 8, if the end of the retransmission at time $\tau_7$ plus the time $T_{TB}$, which is needed by the UE for processing the transport block TB received between $\tau_5$ and $\tau_7$, is earlier than the initially scheduled PUCCH, which has been scheduled e.g. by the DCI over the first control channel at time $\tau_0$, then the UE will use the originally scheduled PUCCH for HARQ feedback as shown in FIG. 8. The partial eMBB retransmission ends at time $\tau_7$ and taking into account the UE expected processing time $T_{TB}$, the UE should be able to determine whether the eMBB decoding passes the CRC check at time $\tau_8$. Since the initial scheduled PUCCH is at a later time $\tau_9$, there is no need to reschedule the PUCCH resources for HARQ feedback. Hence, in this case the UE decides to use the originally scheduled HARQ feedback schedule.

Figure 9:
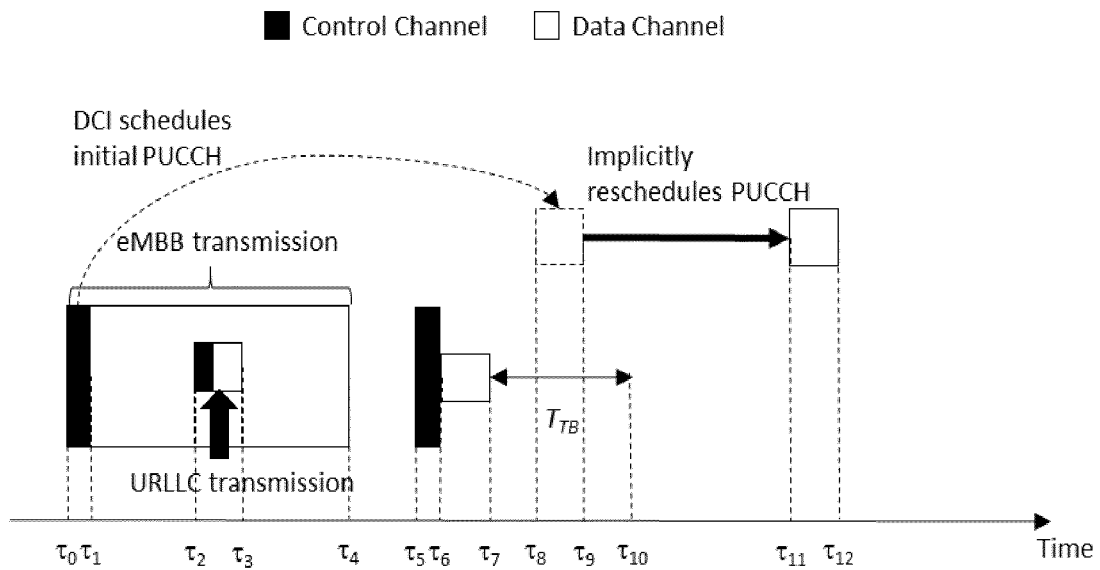
FIG. 9 illustrates an embodiment of an implicit rescheduling of a HARQ transmission.

However, as illustrated in FIG. 9, if the end of the retransmission at time $\tau_7$ plus the time $T_{TB}$, which is needed by the UE for processing the retransmitted TB, is later than the initially scheduled PUCCH, then the previously scheduled PUCCH is delayed by a predetermined amount of time.

For example, in FIG. 9 the PUCCH is initially scheduled at $\tau_8$ and the retransmission ending at $\tau_7$ resulted in an earliest expected HARQ feedback at time $\tau_{10}$ assuming a UE TB processing time of $T_{TB}$. Since the partial retransmission causes the UE to miss the initially scheduled PUCCH time, the PUCCH resource is implicitly rescheduled/delayed by a predetermined period to time $\tau_{11}$ by the UE.

The time period $T_{TB}$ may depend on the size of the retransmitted transmission block. Hence, in some embodiments, instead of using the processing time, the size of the retransmitted TB (e.g. between time $\tau_6$ and $\tau_7$) can be used, for example, for estimating the predetermined time period for delaying the HARQ feedback and/or for estimating whether an original scheduled HARQ feedback falls within the processing period. For example, if the transmission block size>a predetermined threshold $S_{TB}$, then the HARQ feedback is implicitly delayed by the UE (time and frequency), otherwise the UE reuses the original HARQ feedback resource (time and frequency).

In another embodiment, for the scenario where the network implicitly reschedules the PUCCH as illustrated for the embodiment of FIG. 9, the UE can still transmit its HARQ feedback using the previous PUCCH resources at time $\tau_8$, i.e. the network can still expect a HARQ feedback from the UE at time $\tau_8$. In this embodiment it is assumed that $T_{TB}$ is an expected UE processing time and that the UE may process the TB faster than the expected $T_{TB}$. For example, a UE with a faster processor or in cases where the TB size is small, less processing time is needed which is, thus, smaller/shorter than the expected $T_{TB}$. Hence, in such embodiments, it is allowed that the UE transmits its HARQ feedback earlier, i.e. at the originally scheduled resource e.g. at time $\tau_8$, such that the network can benefit from the fact that the original HARQ time line is maintained. In this case, the eNodeB may attempt to decode a HARQ ACK/NACK response from the UE at both times $\tau_8$ and $\tau_{11}$. Additionally, the eNodeB may perform further algorithms, such as using the PUCCH with best signal to noise ratio (SNR), perform DTX (discontinuous transmission) estimation on the PUCCHs and may only act on a PUCCH that is not estimated as DTX, etc.

It should be appreciated that the present disclosure is not restricted to cases where an ongoing eMBB transmission is pre-empted by URLLC transmission. Other transmission scenarios where the original resources for HARQ feedback can be compromised can also use the present disclosure. It should also be appreciated that apart from post-indicator, a pre-indicator such as one that occurs prior to or at the same time as the URLLC pre-emption may also lead to a disruption in the HARQ timeline and also in such cases the present disclosure can be used.

As has been discussed, although retransmission is known per se, conventional retransmission techniques do not know which part of the transmission is corrupted. In some embodiments, a DCI carrying the downlink grant to indicate when HARQ feedback (PUCCH) is transmitted is implemented in NB-IoT. However, it has been recognized that once the downlink grant and the HARQ feedback time are indicated, they do not change since in those technologies, there are no interruptions or expectation to change this time line. In contrast, as discussed above, according to some embodiments of the present disclosure, the first HARQ feedback time can change according to the events during the transmission.

Figure 10:
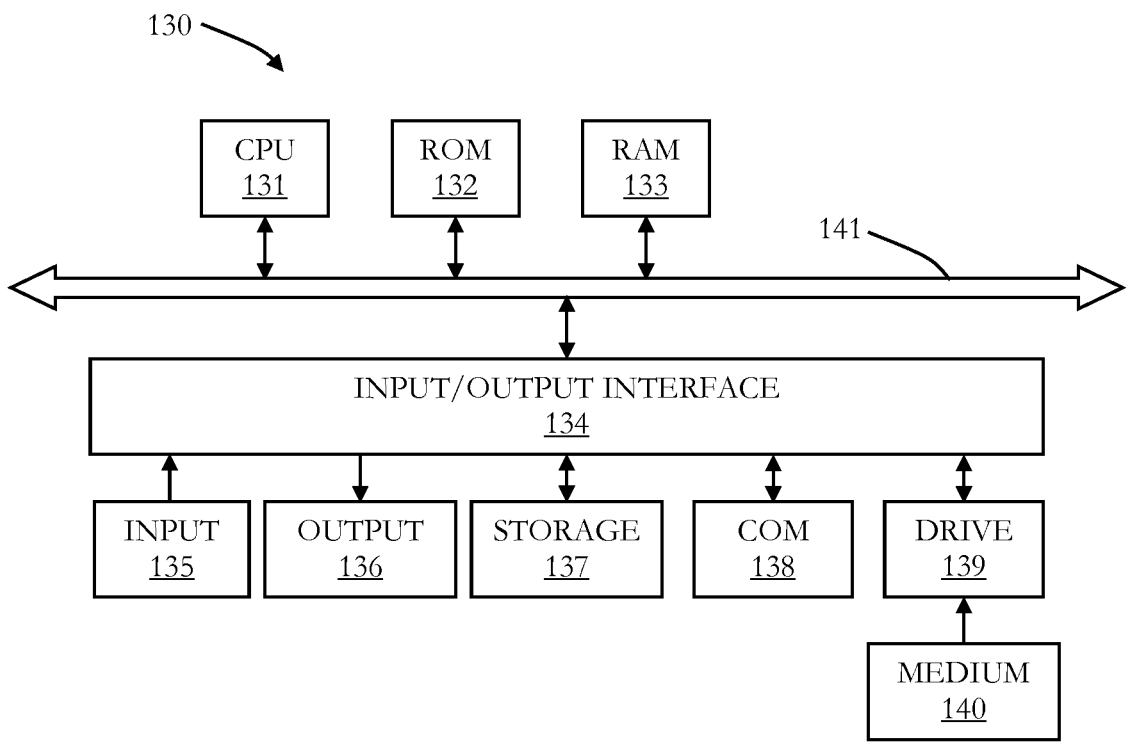
FIG. 10 illustrates an embodiment of a multi-purpose computer which can be used for implementing a base station and a user equipment.

In the following, an embodiment of a general purpose computer 130 is described under reference of FIG. 10. The computer 130 can be implemented such that it can basically function as any type of base station or new radio base station, transmission and reception point, or user equipment as described herein. The computer has components 131 to 140, which can form a circuitry, such as any one of the circuitries of the base stations, and user equipments, as described herein.

Embodiments which use software, firmware, programs or the like for performing the methods as described herein can be installed on computer 130, which is then configured to be suitable for the concrete embodiment.

The computer 130 has a CPU 131 (Central Processing Unit), which can execute various types of procedures and methods as described herein, for example, in accordance with programs stored in a read-only memory (ROM) 132, stored in a storage 137 and loaded into a random access memory (RAM) 133, stored on a medium 140 which can be inserted in a respective drive 139, etc.

The CPU 131, the ROM 132 and the RAM 133 are connected with a bus 141, which in turn is connected to an input/output interface 134. The number of CPUs, memories and storages is only exemplary, and the skilled person will appreciate that the computer 130 can be adapted and configured accordingly for meeting specific requirements which arise, when it functions as a base station or as user equipment.

At the input/output interface 134, several components are connected: an input 135, an output 136, the storage 137, a communication interface 138 and the drive 139, into which a medium 140 (compact disc, digital video disc, compact flash memory, or the like) can be inserted.

The input 135 can be a pointer device (mouse, graphic table, or the like), a keyboard, a microphone, a camera, a touchscreen, etc.

The output 136 can have a display (liquid crystal display, cathode ray tube display, light emittance diode display, etc.), loudspeakers, etc.

The storage 137 can have a hard disk, a solid state drive and the like.

The communication interface 138 can be adapted to communicate, for example, via a local area network (LAN), wireless local area network (WLAN), mobile telecommunications system (GSM, UMTS, LTE, NR etc.), Bluetooth, infrared, etc.

It should be noted that the description above only pertains to an example configuration of computer 130. Alternative configurations may be implemented with additional or other sensors, storage devices, interfaces or the like. For example, the communication interface 138 may support other radio access technologies than the mentioned UMTS, LTE and NR.

When the computer 130 functions as a base station, the communication interface 138 can further have a respective air interface (providing e.g. E-UTRA protocols OFDMA (downlink) and SC-FDMA (uplink)) and network interfaces (implementing for example protocols such as S1-AP, GTP-U, S1-MME, X2-AP, or the like). Moreover, the computer 130 may have one or more antennas and/or an antenna array. The present disclosure is not limited to any particularities of such protocols.

The methods as described herein are also implemented in some embodiments as a computer program causing a computer and/or a processor and/or circuitry to perform the method, when being carried out on the computer and/or processor and/or circuitry. In some embodiments, also a non-transitory computer-readable recording medium is provided that stores therein a computer program product, which, when executed by a processor and/or circuitry, such as the processor and/or circuitry described above, causes the methods described herein to be performed.

It should be recognized that the embodiments describe methods with an exemplary order of method steps. The specific order of method steps is, however, given for illustrative purposes only and should not be construed as binding.

All units and entities described in this specification and claimed in the appended claims can, if not stated otherwise, be implemented as integrated circuit logic, for example on a chip, and functionality provided by such units and entities can, if not stated otherwise, be implemented by software.

In so far as the embodiments of the disclosure described above are implemented, at least in part, using a software-controlled data processing apparatus, it will be appreciated that a computer program providing such software control and a transmission, storage or other medium by which such a computer program is provided are envisaged as aspects of the present disclosure.

Note that the present technology can also be configured as described below.

(1) A base station for a mobile telecommunications system comprising circuitry configured to communicate with at least one user equipment, wherein the circuitry is further configured to:
transmit a short data transmission in a long data transmission; and
schedule, based on the transmission of the short data, a HARQ ACK/NACK response relating to at least a part of the long data transmission.

(2) The base station of (1), wherein the circuitry is further configured to retransmit at least a part of the long data transmission, based on the transmission of the short data.

(3) The base station of (2), wherein the scheduling of the HARQ ACK/NACK response is performed when an already scheduled HARQ ACK/NACK response falls within a processing period of the user equipment for processing the received retransmitted part of the long data transmission.

(4) The base station of anyone of (1) to (3), wherein the scheduling of the HARQ ACK/NACK response is signaled over a control channel.

(5) The base station of (4), wherein the control channel is established before, during or after the short data transmission.

(6) The base station of anyone of (1) to (5), wherein the scheduling of the HARQ ACK/NACK response is signaled by a post-indicator.

(7) The base station of (6), wherein the post-indicator is transmitted after the short data transmission.

(8) The base station of (6) or (7), wherein the post-indicator is a scheduling message.

(9) The base station of (6) or (7), wherein the post-indicator indicates whether an already scheduled HARQ ACK/NACK response is maintained or whether the already scheduled HARQ ACK/NACK response is postponed.

(10) The base station of (9), wherein the already scheduled HARQ ACK/NACK response is postponed by a predetermined time.

(11) The base station of (10), wherein the predetermined time is a predetermined time offset.

(12) The base station of (10) or (11), wherein the predetermined time is signaled to the user equipment.

(13) The base station of anyone of (1) to (12), wherein the scheduling of the HARQ ACK/NACK response includes scheduling of resources for transmission of the HARQ ACK/NACK response.

(14) The base station of anyone of (1) to (13), wherein the scheduling of the HARQ ACK/NACK response is transmitted based on a downlink control indicator.

(15) The base station of anyone of (1) to (14), wherein the long data transmission is an enhanced mobile broadband data transmission.

(16) The base station of anyone of (1) to (15), wherein the short data transmission is an ultra-reliable and low latency data transmission.

(17) The base station of anyone of (1) to (16), wherein the long data transmission is a physical downlink shared channel data transmission.

(18) The base station of anyone of (1) to (17), wherein the HARQ ACK/NACK response is transmitted over a physical uplink control channel.

(19) A base station for a mobile telecommunications system comprising circuitry configured to communicate with at least one user equipment, wherein the circuitry is further configured to:
transmit a short data transmission in a long data transmission; and
receive, based on the transmission of the short data, a HARQ ACK/NACK response relating to at least a part of the long data transmission after an already scheduled HARQ ACK/NACK response.

(20) The base station of (19), wherein the circuitry is further configured to retransmit at least a part of the long data transmission, based on the transmission of the short data.

(21) The base station of (20), wherein the HARQ ACK/NACK response is received after a processing period of the user equipment for processing the received retransmitted part of the long data transmission.

(22) The base station of anyone of (19) to (21), wherein the circuitry sets a predefined time period for receiving the HARQ ACK/NACK response.

(23) The base station of (22), wherein the predefined time period is set based on the point of time for which the already scheduled HARQ ACK/NACK response is scheduled.

(24) The base station of (22), wherein the predefined time period is set based on a transport block size of the long data transmission.

(25) The base station of (22), wherein the predefined time period is set based on a transmission block size of the part of the long data transmission which is to be retransmitted.

(26) The base station of (25), wherein the predefined time period is set based on an estimated processing time of the user equipment needed for processing the part of the long data transmission which is to be retransmitted.

(27) The base station of (25), wherein the predefined time period is set if the transmission block size is greater than or equal to a predefined threshold value.

(28) A user equipment for a mobile telecommunications system comprising circuitry configured to communicate with at least one base station, wherein the circuitry is further configured to:
receive a long data transmission; and
receive scheduling information for a HARQ ACK/NACK response, such that the HARQ ACK/NACK response can be transmitted after having processed at least one of the long data transmission and a received retransmission of at least a part of the long data, when data of the long data transmission are corrupted.

(29) The user equipment of (28), wherein the scheduling information is received over a control channel.

(30) The user equipment of (28) or (29), wherein the scheduling information is represented by a post-indicator.

(31) The user equipment of (30), wherein the post-indicator includes a scheduling message.

(32) The user equipment of (30), wherein the post-indicator indicates whether an already scheduled HARQ ACK/NACK response is maintained or whether the already scheduled HARQ ACK/NACK response is postponed.

(33) The user equipment of (32), wherein the already scheduled HARQ ACK/NACK response is postponed by a predetermined time.

(34) The user equipment of (33), wherein the predetermined time is a predetermined time offset.

(35) The user equipment of anyone of (28) to (34), wherein the scheduling information is represented by a downlink control indicator.

(36) The user equipment of anyone of (28) to (35), wherein the long data transmission is an enhanced mobile broadband data transmission.

(37) The user equipment of anyone of (28) to (36), wherein the short data transmission is an ultra-reliable and low latency data transmission.

(38) The user equipment of anyone of (28) to (37), wherein the long data transmission is a physical downlink shared channel data transmission.

(39) The user equipment of anyone of (28) to (38), wherein the HARQ ACK/NACK response is received over a physical uplink control channel.

(40) A user equipment for a mobile telecommunications system comprising circuitry configured to communicate with at least one base station, wherein the circuitry is further configured to:
receive a long data transmission; and
transmit a HARQ ACK/NACK response after having processed at least one of the long data transmission and a received retransmission of at least a part of the long data, when data of the long data transmission are corrupted.

(41) The user equipment of (40), wherein the HARQ ACK/NACK response is transmitted after a predefined time period.

(42) The user equipment of (41), wherein the predefined time period is based on the point of time for which an already schedule HARQ ACK/NACK response is scheduled.

(43) The user equipment of (41), wherein the predefined time period is set based on a transport block size of the long data transmission.

(44) The user equipment of (41), wherein the predefined time period is set based on a transmission block size of the part of the long data transmission which is retransmitted.

(45) The user equipment of anyone of (40) to (44), wherein the predefined time period is set based on an estimated processing time of the user equipment needed for processing the part of the long data transmission which is retransmitted.

(46) The user equipment of anyone of (40) to (45), wherein the predefined time period is set if the transmission block size is greater than or equal to a predefined threshold value.

The invention claimed is:

1. A base station for a mobile telecommunications system comprising circuitry configured to communicate with at least one user equipment, wherein the circuitry is further configured to:
schedule a long data transmission and a first Hybrid Automatic Repeat Request "HARQ" Acknowledgement/Negative Acknowledgement "ACK/NACK" response relating to the long data transmission;
transmit the long data transmission;
transmit a short data transmission, the short data transmission pre-empting a portion of the long data transmission;
send a post-indicator pertaining to whether the first HARQ ACK/NACK response is replaced by a second HARQ ACK/NACK response, maintained, or postponed;
schedule, based on the transmission of the short data, the second HARQ ACK/NACK response relating to at least a part of the long data transmission; and
retransmit the pre-empted portion of the long data transmission signal.

2. The base station of claim 1, wherein the circuitry is further configured to retransmit at least a part of the long data transmission, based on the transmission of the short data.

3. The base station of claim 2, wherein the scheduling of the second HARQ ACK/NACK response is performed when the first HARQ ACK/NACK response falls within a processing period of the user equipment for processing the received retransmitted pan of the long data transmission.

4. The base station of claim 1, wherein the scheduling of the HARQ ACK/NACK response is signaled over a control channel.

5. The base station of claim 1, wherein the post-indicator is a scheduling message.

6. The base station of claim 1, wherein the scheduling of the HARQ ACK/NACK response includes scheduling of resources for transmission of the HARQ ACK/NACK response.

7. The base station of claim 1, wherein the scheduling of the HARQ ACK/NACK response is transmitted based on a downlink control indicator.

8. The base station of claim 1, wherein the long data transmission is an enhanced mobile broadband data transmission.

9. The base station of claim 1, wherein the short data transmission is an ultra-reliable and low latency data transmission.

10. The base station of claim 1, wherein the long data transmission is a physical downlink shared channel data transmission.

11. The base station of claim 1, wherein the HARQ ACK/NACK response is transmitted over a physical uplink control channel.

12. A user equipment for a mobile telecommunications system comprising circuitry configured to communicate with at least one base station, wherein the circuitry is further configured to:
   receive scheduling of a long data transmission and a first Hybrid Automatic Repeat Request "HARQ" Acknowledgement/Negative Acknowledgement "ACK/NACK" response relating to the long data transmission;
   receive the long data transmission;
   receive a short data transmission, the short data transmission pre-empting a portion of the long data transmission;
   receive a post-indicator pertaining to whether the first HARQ ACK/NACK response is replaced by a second HARQ ACK/NACK response, maintained, or postponed;
   receive a scheduling, based on the transmission of the short data, the second HARQ ACK/NACK response relating to at least a part of the long data transmission; and
   receive a retransmission of the pre-empted portion of the long data transmission signal.

13. The user equipment of claim 12, wherein the scheduling of the long transmission and the first and second HARQ ACK/NACK responses is received over a control channel.

14. The user equipment of claim 12, wherein the second HARQ ACK/NACK response is transmitted after a predefined time period.

* * * * *